US007464182B2

(12) United States Patent
Kwong

(10) Patent No.: US 7,464,182 B2
(45) Date of Patent: *Dec. 9, 2008

(54) APPARATUS, METHOD AND COMPUTER PROGRAM PRODUCT FOR PRODUCING A RESOURCE DESCRIPTOR

(75) Inventor: Michael Yiupun Kwong, Stanford, CA (US)

(73) Assignee: International Business Machines Corporation, Armonk, NY (US)

( * ) Notice: Subject to any disclaimer, the term of this patent is extended or adjusted under 35 U.S.C. 154(b) by 835 days.

This patent is subject to a terminal disclaimer.

(21) Appl. No.: 10/634,947

(22) Filed: Aug. 5, 2003

(65) Prior Publication Data

US 2005/0033861 A1 Feb. 10, 2005

(51) Int. Cl.
*G06F 15/16* (2006.01)

(52) U.S. Cl. .......................................... 709/245; 707/3

(58) Field of Classification Search ................. 709/245; 707/3
See application file for complete search history.

(56) References Cited

U.S. PATENT DOCUMENTS

| 5,712,979 | A | * | 1/1998 | Graber et al. ................ 709/224 |
| 5,907,704 | A | | 5/1999 | Gudmundson et al. |
| 6,041,324 | A | | 3/2000 | Earl et al. |
| 6,058,423 | A | | 5/2000 | Factor ........................ 709/226 |
| 6,078,916 | A | | 6/2000 | Culliss |
| 6,094,665 | A | | 7/2000 | Lyons et al. |
| 6,096,096 | A | | 8/2000 | Murphy et al. |
| 6,182,140 | B1 | * | 1/2001 | Feig et al. .................... 709/226 |
| 6,192,407 | B1 | * | 2/2001 | Smith et al. .................. 709/229 |
| 6,271,840 | B1 | | 8/2001 | Finseth et al. |
| 6,311,219 | B1 | | 10/2001 | Factor |
| 6,453,350 | B1 | | 9/2002 | Factor ........................ 709/226 |

FOREIGN PATENT DOCUMENTS

GB     2359905 A  *  9/2001

OTHER PUBLICATIONS

"XML Pointer Language (XPointer)," http://www.w3.org/TR/xptr, pp. 1-2.
Berners-Lee, T. et al., "Uniform Resource Locators (URL)," http://www.ietf.org/rfc/rfc1738.txt, Dec. 1994, pp. 1-24.
Fielding, R., "Relative Uniform Resource Locators," http://www.ietf.org/rfc/rfc1808.txt, Jun. 1995, pp. 1-15.

(Continued)

*Primary Examiner*—Andrew Caldwell
*Assistant Examiner*—Christopher D Biagini
(74) *Attorney, Agent, or Firm*—Sawyer Law Group LLP

(57) ABSTRACT

Disclosed is an apparatus for producing a resource descriptor for a particular resource having an associated URI, including a controller forming one or more candidate signatures for the particular resource wherein said controller identifies one of said candidate signatures having a predetermined level of correspondence to the particular resource as a signature for the particular resource; and a concatenator for merging the signature with the URI to produce the resource descriptor. A method, and computer program product having executable instructions for implementing the method, includes forming one or more candidate signatures for the particular resource wherein one of said candidate signatures having a predetermined level of correspondence to the particular resource is identified as a signature for the particular resource; and concatenating the signature with the URI to produce the resource descriptor.

3 Claims, 3 Drawing Sheets

OTHER PUBLICATIONS

Heim, Judy, Web error Messages and How to Handle Them (Question and Answer), PC World, N7, V16, Jul. 1998, p. 294.

Stevens, Larry, Web Site Management Tools, Government Computer news, N19, V17, Jun. 29, 1998, p. 57.

Pleas, Keith, Windows NT Option Pack (Version 4.0), PC Magazine, N6, V17, Mar. 24, 1998, p. 249.

* cited by examiner

APPARATUS, METHOD AND COMPUTER PROGRAM PRODUCT FOR PRODUCING A RESOURCE DESCRIPTOR

CROSS-REFERENCE TO RELATED APPLICATION

The present application is related to application Ser. No. 10/634,617 entitled "Apparatus, Method and Computer Program Product for Resource Locator Using Queries" and filed on even date herewith.

FIELD OF THE INVENTION

The present invention relates generally to producing references to resources distributed over multiple locations, and more specifically to creating a generalized resource locator for accessing a particular resource and/or related resources potentially distributed across multiple locations across multiple computing systems on a network.

BACKGROUND OF THE INVENTION

The use of a uniform resource locator (URL) by a web browser to locate and retrieve a particular document that is stored in a particular location on one of thousands of computer systems all connected to a network is well-known. The use of a URL in this instance is satisfactory for documents that are located where they are expected.

However, if a document is moved, deleted or modified, the URL may become inappropriate for the document. The URL may be inappropriate because the document no longer resides at the location specified, or the document that resides at the location specified is not the one that was available when the URL was specified.

In some instances, the document specified not only resides at the specified location, but in one or more other locations besides the specified location. Sometimes, it is advantageous to find these documents in the alternate locations.

Accordingly, what is needed is a system and method for better management of documents distributed over multiple computers on a network.

SUMMARY OF THE INVENTION

Disclosed is an apparatus for producing a resource descriptor for a particular resource having an associated URI, including a controller forming one or more candidate signatures for the particular resource wherein said controller identifies one of said candidate signatures having a predetermined level of correspondence to the particular resource as a signature for the particular resource; and a concatenator for merging the signature with the URI to produce the resource descriptor. A method, and computer program product having executable instructions for implementing the method, includes forming one or more candidate signatures for the particular resource wherein one of said candidate signatures having a predetermined level of correspondence to the particular resource is identified as a signature for the particular resource; and concatenating the signature with the URI to produce the resource descriptor.

The apparatus, method and computer program product generate a signature for a particular resource that permits accessing of the resource, and copies of the resource, even when a URL for the resource is inappropriate (e.g., the resource has moved or has not been updated).

DETAILED DESCRIPTION

The present invention relates to managing references to resources distributed over multiple locations. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
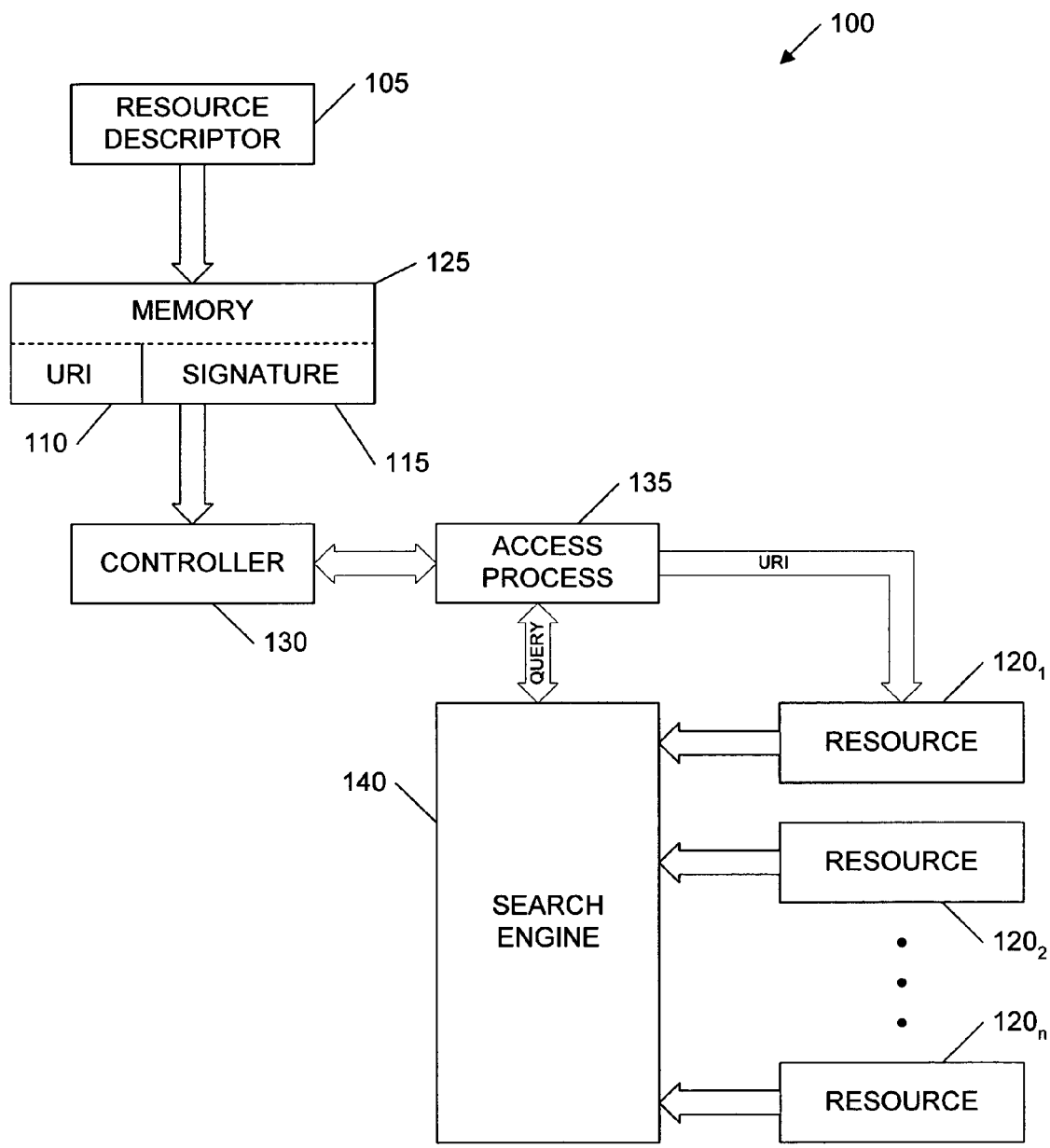
FIG. 1 is a schematic block diagram for a preferred embodiment of a resource access apparatus.

FIG. 1 is a schematic block diagram for a preferred embodiment of a resource access apparatus 100 that uses a resource descriptor 105 having both a uniform resource identifier (URI) 110 and a signature 115. Descriptor 105 is a reference to a specific resource $120_1$ of a plurality of references $120_n$ distributed over multiple locations, typically over multiple networked computers. URI 110 and signature 115 are written into a memory 125 coupled to a controller 130 that interacts with an access process 135, in cooperation with a search engine 140, for accessing one or more resources 120. As used herein, resource refers to any directly addressable object, datum, file, or portion thereof. Memory includes typical memory formats (e.g., volatile or non-volatile semiconductor storage, magnetic storage, magneto-optic storage) as well as other storage formats such as, for example, a database, web page link in an hyper-text markup language (HTML) file.

URI 110 may be any direct reference resource address, such as for example an address using a uniform resource locator (URL), a universal naming convention (UNC), or a directory-file structure (DFS) name. Signature 115 is a reference identity qualifier that has several potential uses. One use is to ensure that a resource located by a URI is in fact the desired document. A signature is generated from the located resource and compared to signature 115 supplied by resource descriptor 105. Matching signatures (to within a tolerance) confirms that the located resource is the intended resource. For instance, if signature 115 is chosen to be a search query, the document located by the URI is consistent with signature 115, if a search based on signature 115 returns the located document as the top (N) results in the result set.

Additionally, signature 115 is used to locate the proper resource and closely related documents, and may be used even when URI finds the desired resource. In this use, signature 115 is actually a query that is reasonably guaranteed to return the desired resource as the top (or top N) entries in a related or qualified search result list of resources. When URI 110 locates a candidate resource, signature 115 qualifies the candidate resource when the located resource is returned in the search result list. Further, signature 115 may be used to find other copies of the desired resource as well as other resources similar to the desired resource. When URI 110 does not locate a candidate resource, signature 115 locates one or more candidate resources.

Controller 130 is a microprocessor, microcontroller or the like that operates according to instructions specified by access process 135, using the information stored in memory 125 to extract the resource descriptor 105 (or portions thereof) to locate and/or retrieve a desired resource and/or one or more qualified candidate resources.

Access process 135 is a sequence of steps for confirming location, locating, accessing, retrieving, using, transferring, copying, deleting, modifying, etc., a particular resource $120_1$. Access process 135 may be implemented in a browser, file system, or other application or routine of a computing system.

The use of search engines and of indexing engines on computing systems, intranets, extranets, networks, wide-area-networks, and other collections of computing systems is well-known. A usefulness of the preferred embodiment of the present invention is improved when a search engine is available and resources 120 are fully-indexed and reasonable efforts are made to maintain the indices. However, other signature systems may be used in other implementations, including systems for dynamic generation of signatures or signature-related information.

Figure 2:
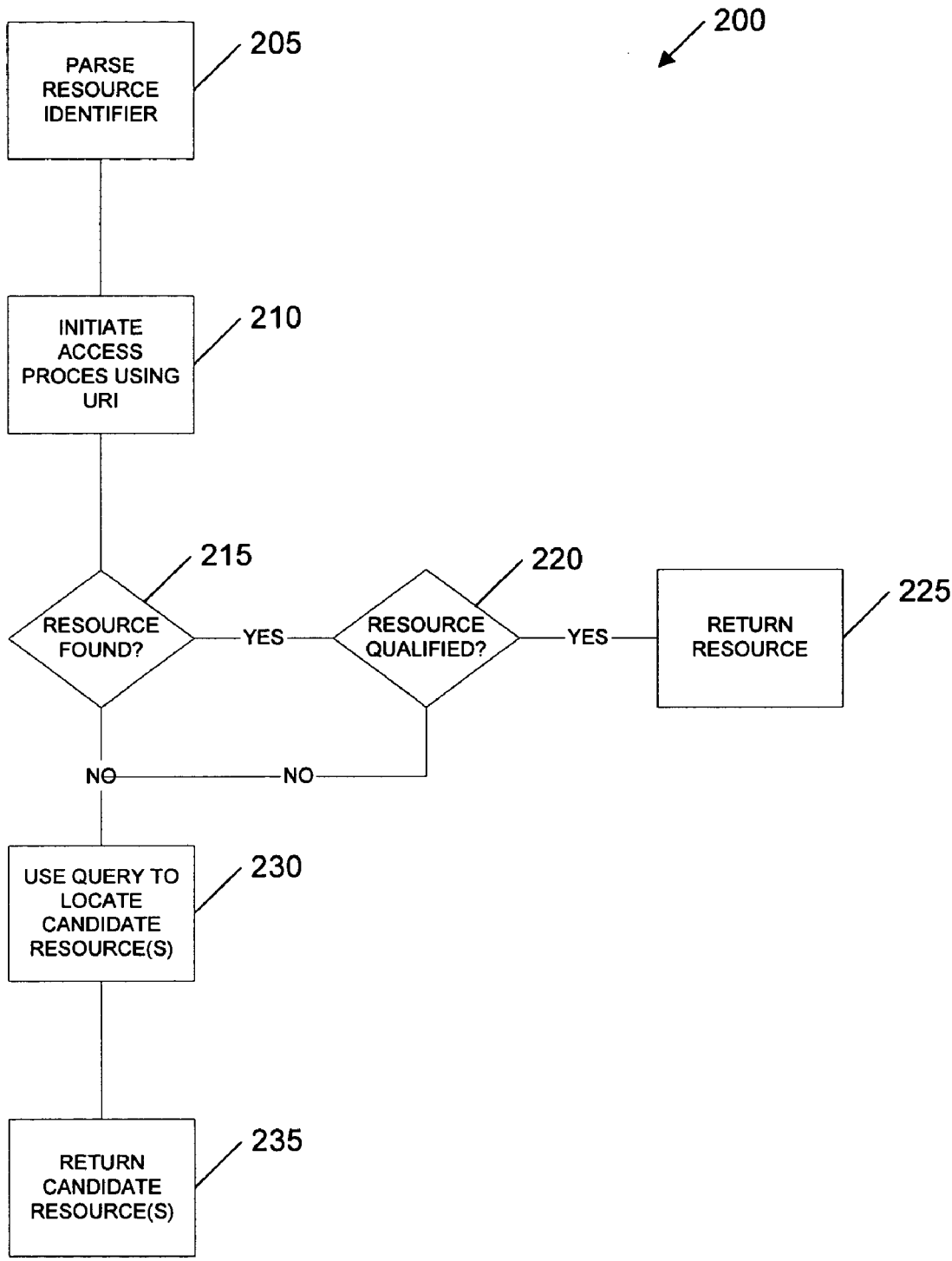
FIG. 2 is a schematic flow diagram for a preferred embodiment of a resource access process.

FIG. 2 is a schematic flow diagram for a preferred embodiment of a resource access process 200. Apparatus 100 shown in FIG. 1 implements process 200 to access a resource using a resource descriptor. In typical operation, resource descriptor 105 is used in all places where reference to a particular resource is needed, for example, e-mails to colleagues, references to a hypertext document, and as document links in a document database.

Process 200, at step 205, parses resource descriptor 105 into URI 110 and signature 115. Next at step 210, process 200 initiates operation of access process 135. Process 200 first uses URI 110 to initiate an access of the desired resource $120_1$.

At step 215, process 200 determines whether a candidate resource is located from step 210. When a candidate resource is found, process 200 may perform an optional test at step 220 to determine whether the candidate resource is qualified by signature 115. An example of a qualification is whether signature 115 matches the candidate resource closely enough, or in the case of a query signature, whether the candidate resource is sufficiently close on a search score.

When the candidate resource is qualified at step 220, process 200 executes step 225 and returns the candidate resource. Step 225 may, in some implementations, not actually return the candidate resource, but return a URI for the candidate resource. In other implementations, the candidate resource may be operated on by some other process after being located at step 225.

If no candidate resource is found, or if a located candidate resource is not qualified, process 200 executes step 230 to use signature 115 to locate one or more qualified candidate resources. When signature 115 is a query, the query is applied to the applicable search engines.

When the qualified candidate resource(s) are located at step 230, process 200 executes step 235 to return the candidate resource(s). Step 235 may, in some implementations, not actually return the candidate resource(s), but return one or more URIs for the candidate resource(s). In other implementations, the candidate resource may be operated on by some other process after being located at step 235. Providing search engine 140 with "fuzzy" searching capability permits location of similar resources to a specific intended URI.

Figure 3:
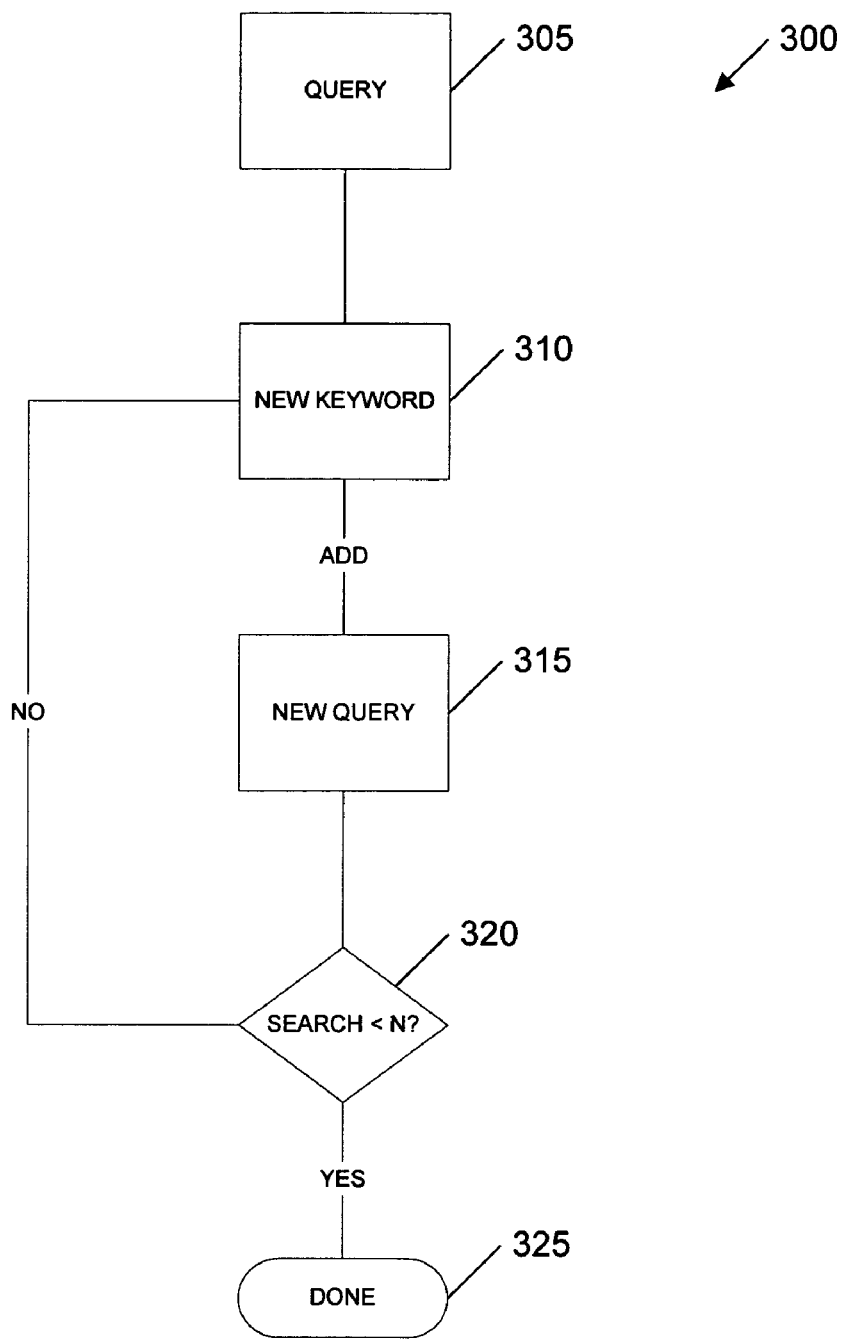
FIG. 3 is a schematic flow diagram for a preferred embodiment of a resource identifier creation process.

FIG. 3 is a schematic flow diagram for a preferred embodiment of a resource identifier creation process 300. Process 300 begins at step 305 with an initial query (which in some cases is null or blank) or includes some specific initial value or set of values depending upon the implementation. Whatever the initial query at step 305, process 300 next (step 310) selects a keyword to be used with the current value of the query. In the preferred embodiment, the existence of a full index of the resource set improves the value of the present invention. Step 310 selects a keyword from the index.

Each keyword may be chosen in multiple ways. An "efficient" (e.g., a small) search query may be generated by first selecting keywords whose corresponding index entry is contained by the least number of resources. A search query that is a good signature of a particular resource is achieved by examining statistics of the resource. Keywords that are referenced a maximum number of times are selected first.

Process 300 at step 315 merges or adds the keyword from step 310 to the current state of the query to produce a new query. The fitness of the new query as a signature is tested next at step 320. Process 300 conducts a search using the query obtained from step 315 and examines a size of the result set. If the size is less than a predetermined size N, then the query from step 315 is satisfactory and the query/signature generation process concludes at step 325.

However, if at step 320 the search result size is greater than N, process 300 returns to step 310 to select a new keyword. Process 300 repeats step 310 through step 320 until the search result size is less than N.

The following is an example of the preferred embodiment for use with a web-based magazine. A current issue is located at http://www.wbmagazine.com/issues/current/index.html. A subscriber of the magazine bookmarks the URI as indicated above and has easy access to the current issue of the magazine.

The magazine provides users with access to articles and information contained in previous issues. Back issues of the magazine are kept at http://www.wbmagazine.com/issues/yyyy_mm_dd/index.html, with yyyy_mm_dd representing the publication date of any particular back issue. When a next issue is published, the content under http://www.wbmagazine.com/issues/current/index.html is moved to the appropriate location in the http://www.wbmagazine.com/issues/yyyy_mm_dd/index.html format.

A reader is interested in a particular article regarding "java beans" in the current issue: http://www.wbmagazine.com/issues/current/features/javabeans.html. The reader bookmarks the location, without appreciating that when the next issue is published, the bookmark will be invalid. Failure of the bookmark leads the reader to attempt to search for the article, with the reader attempting to formulate an effective query to locate the java beans article. Unfortunately, it can be that there are a great many of articles regarding "java beans" as that may be a popular topic for the magazine. The search results may produce interesting articles, but the reader may need to expend considerable effort to find the desired article, if it is to be found at all.

When the reader bookmarks a descriptor for the article instead of the URI, the problem is avoided. One possible presentation of the descriptor would be http://www.wbmagazine.com/issues/current/featuures/javabeans.html?query="jb_signature" with the descriptor being a servlet request, though other implementations are possible. Using the descriptor to access the bookmarked issue, the web site will first attempt to use the URI to access the resource. If the article has moved, the servlet conducts a search on the site servers to locate the resource. Instead of an error page, the servlet returns a list of N candidate resources that the reader may choose from.

When a candidate resource is found with the URI, the servlet qualifies the candidate resource to determine whether the resource is consistent with the signature. The servlet may again present a list of alternate candidate resources when the URI is not qualified. In some instances, even when the URI is qualified, the servlet may return a list of additional candidate resources similar to the resource at the URI.

One of the preferred implementations of the present invention is as a routine in an operating system made up of programming steps or instructions resident in memory 125, FIG. 1, during computer operations. Until required by the computer system, the program instructions may be stored in another readable medium, e.g. in a disk drive, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media in a variety of forms.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An apparatus for producing a resource descriptor for a particular resource having an associated URI, comprising:
   a controller for:
   receiving a query;
   selecting one or more key words from an index of resources based on a maximum number of times the one or more keywords are referenced;
   adding the selected key words to the query to form one or more candidate signatures for the particular resource, wherein one of said candidate signatures having a predetermined level of correspondence to the particular resource is identified as a signature for the particular resource, wherein the signature uniquely identifies the URI in a relevant dataset, wherein the signature identifies the URI and a predetermined additional number of related resources, wherein the signature is a query that is used to return the desired resource as a top entry in a search result list of resources, wherein the signature qualifies the resources in the search result list, wherein the signature is used to find other copies of the desired resource and other resources similar to the desired resource, wherein the signature locates the desired resource if the URI does not locate a desired resource;
   merging the signature with the URI to produce the resource descriptor, wherein the resource descriptor is adapted to be substituted for the URI when addressing the particular resource, wherein the resource descriptor is a reference to a specific resource of a plurality of references distributed over multiple networked computers; and
   conducting a search to determine whether the resource descriptor is satisfactory, wherein the resource descriptor is satisfactory if the search results in a size that is less than a predetermined number.

2. A method of forming a resource descriptor for a particular resource having an associated URI, the method comprising:
   receiving a query;
   selecting one or more key words from an index of resources based on a maximum number of times the one or more keywords are referenced;
   adding the selected key words to the query to form one or more candidate signatures for the particular resource, wherein one of said candidate signatures having a predetermined level of correspondence to the particular resource is identified as a signature for the particular resource, wherein the signature uniquely identifies the URI in a relevant dataset, wherein the signature identifies the URI and a predetermined additional number of related resources, wherein the signature is a query that is used to return the desired resource as a top entry in a search result list of resources, wherein the signature qualifies the resources in the search result list, wherein the signature is used to find other copies of the desired resource and other resources similar to the desired resource, wherein the signature locates the desired resource if the URI does not locate a desired resource;
   concatenating the signature with the URI to produce the resource descriptor, wherein the resource descriptor is adapted to be substituted for the URI when addressing the particular resource, wherein the resource descriptor is a reference to a specific resource of a plurality of references distributed over multiple networked computers; and
   conducting a search to determine whether the resource descriptor is satisfactory, wherein the resource descriptor is satisfactory if the search results in a size that is less than a predetermined number.

3. A computer program product comprising a computer readable medium carrying program instructions for forming a resource descriptor for a particular resource having an associated URI when executed using a computing system, the executed program instructions executing a method, the method comprising:
   receiving a query;
   selecting one or more key words from an index of resources based on a maximum number of times the one or more keywords are referenced;
   adding the selected key words to the query to form one or more candidate signatures for the particular resource, wherein one of said candidate signature having a predetermined level of correspondence to the particular resource is identified as a signature for the particular resource, wherein the signature uniquely identifies the URI in a relevant dataset, wherein the signature identifies the URI and a predetermined additional number of related resources, wherein the signature is a query that is used to return the desired resource as a top entry in a search result list of resources, wherein the signature qualifies the resources in the search result list, wherein the signature is used to find other copies of the desired resource and other resources similar to the desired resource, wherein the signature locates the desired resource if the URI does not locate a desired resource;
   concatenating the signature with the URI to produce the resource descriptor, wherein the resource descriptor is adapted to be substituted for the URI when addressing the particular resource, wherein the resource descriptor is a reference to a specific resource of a plurality of references distributed over multiple networked computers; and
   conducting a search to determine whether the resource descriptor is satisfactory, wherein the resource descriptor is satisfactory if the search results in a size that is less than a predetermined number.

* * * * *